3,405,110
POLY(PROPYNOL) PREPARED USING A NICKEL DICARBONYL DI(TRIPHENYLPHOSPHINE) IN AN INERT NON-HYDROXYLATED ORGANIC SOLVENT
Otto F. Hecht, Easton, Pa., and Arthur P. Castaldi, Phillipsburg, N.J., assignors to GAF Corporation, a corporation of Delaware
No Drawing. Filed Mar. 2, 1964, Ser. No. 348,874
2 Claims. (Cl. 260—91.3)

This invention relates to poly(propynol), an insoluble rust colored polymer having several useful applications, and to the process of preparing the same.

We have discovered that when anhydrous propynol is added to a refluxing solution of nickel dicarbonyl di-(triphenylphosphine) in an inert non-hydroxylated organic solvent, a rust colored polymer is obtained which is insoluble in water and organic solvents.

In practicing our discovery, anhydrous propynol (propargyl alcohol) is added slowly at a rate of 0.97 part to 1.0 part by volume per minute into a refluxing solution consisting of 25–35 parts by weight of nickel dicarbonyl di(triphenylphosphine) as catalyst in approximately 1400–1800 parts by volume of a liquid, inert organic compound free from hydroxyl groups, such as aromatic hydrocarbons, i.e. benzene, toluene, zylene, etc., tetrahydrofuran, dioxane, etc., until 400–500 parts by volume of propynol have been added. The latter requires anywhere from 7 to 9 hours. The refluxing is continued from 2 to 4 hours. The reaction mixture is then cooled to 10° C. and then kept at ambient temperature until two separate layers are formed. The lower viscous layer is separated, water added in an amount ranging from about 2 to 3 times by volume of the amount of propynol added to the reaction. It is to be noted that the amount of water is immaterial as long as the water mixture is stirred for at least 10 minutes. The mixture is then warmed to 65°–80° C. and steam distilled. The steam-treated reaction product is then diluted with about an equal amount of water, centrifuged for 30–60 minutes at about 2400 r.p.m. and the solid poly(propynol) recovered by filtration. The resulting polymer is then subjected to one or more treatments with 10% aqueous hydrochloric acid, washed several times with water and then dried to constant weight. The latter treatment removes substantially all of the nickel oxide (originating from the catalyst) as the nickel chloride.

It is to be noted that any organic liquid compound which is a solvent for the catalyst may be employed. The only precaution to be taken is that the organic liquid compound be free from hydroxyl groups which would react with the catalyst. The polymer, poly(propynol) or poly (propargyl alcohol) which are synonymous, is useful in compositions for solid rocket fuels, or a semiconductor, cork substitute or as a filler for thermosetting resins.

The following examples will illustrate the preparation of poly(propynol) and its applications. All parts given are by weight unless otherwise stated:

Example I 30 parts of nickel dicarbonyl di(triphenylphosphine), prepared according to the procedure described by Walter Reppe et al. in Liebig's Ann. 560, 104, 1948 and by Otto F. Hecht and H. Kroper in U.S. Department of Commerce, Publication Board No. 99,207, pages 88 and 92, were dissolved in 1600 parts by volume of pure benzene and heated to reflux. To the refluxing solution anhydrous propynol (propargyl alcohol) was added at a rate of 0.97 part by volume per minute. After 450 parts by volume of propynol had been added within 8 hours, the refluxing was continued for 2 hours and 45 minutes. The reaction mixture was then cooled to 10° C. and allowed to stand at ambient temperature for 3 hours. Two layers formed which were readily separated. The upper layer was predominantly benzene and free from propynol and the lower layer was viscous. To the latter there were added 800 parts by volume of water and the mixture stirred for 20 minutes. The resulting mixture, containing finely suspended particles of poly(propynol), was warmed to 75° C. and then steam distilled for one hour. The steam-treated reaction product was diluted with about an equal amount of water, centrifuged for 45 minutes at 2400 r.p.m., and the solid poly(propynol) separated by filtration. There were obtained 26 parts of rust colored poly-(propynol) which after drying contained 15.9% NiO and a trace of phosphorus originating from the triphenylphosphine. The NiO was removed as nickel chloride by treatment with 10% aqueous hydrochloric acid, the poly-(propynol) washed with water several times to remove the nickel chloride and then dried to constant weight.

Elementary analysis showed 64.13% of carbon, 7.20% of hydrogen and 28.67% of oxygen (by difference), whereas the atomic formula $(C_3H_4O)_n$ of the poly(propynol) required (calculated) 64.28% of carbon, 7.14% of hydrogen and 28.57% of oxygen.

Poly(propynol) is insoluble in water and all organic solvents so far tried. It does not decolorize bromine in carbon tetrachloride. It is completely amorphous. No crystalline reflections were observed with Philips X-ray diffractometer. It absorbed in the infra-red at 3300 cm.$^{-1}$ (hydroxyl), 2850 cm.$^{-1}$ (—CH$_2$—), conjugated $-(CH=CH)-$ at 1635 cm.$^{-1}$ and the characteristic 1020 cm.$^{-1}$ band of the poly (acetylene) trans structure. It, therefore, has the following structure:

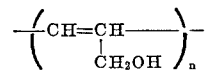

which is consistent with its infra-red spectrum.

As is readily understandable, the value of $n$, i.e., the number of units in the polymer chain, cannot be determined by current methods because of the insoluble character of poly(propynol). Its general insolubility is due to crosslinking of the type encountered in the preparation of poly(acetylene) by the prior art method.

Example II 100 parts of the condensation product of phenol and formaldehyde (1 mole:0.96 mole), prepared with oxalic acid as catalyst, 80 parts of poly(propynol), 10 parts of hexamethylenetetramine, 2 parts stearic acid and 10 parts of magnesium oxide were mixed to 120° C. on heated calenders, until a band of thermosetting molding mixture was obtained, which required about 5 minutes. The molding mixture was hardened in the press for 4 minutes at 180° C. and 3600 p.s.i.g. pressure to yield a shaped molded body of high dielectric properties.

Example III 100 parts of poly(propynol) were mixed at 80° C. in a heated kneading machine with 100 parts of the liquid, thermosetting reaction product of an acid number of 160, prepared from 2 moles 1,1,1-trimethylolpropane with 3 moles adipic acid, until complete homogeneity was reached. The mixture was then put in dies and hardened at 150° C. to shaped articles with the properties of pressed cork.

We claim:
1. Solid, rust colored, poly(propynol) which is insoluble in water and organic solvents prepared by the polymerization of anhydrous propynol which comprises refluxing said propynol in a solution of nickel dicarbonyl di(triphenylphosphine) in an inert non-hydroxylated organic solvent.

2. The process of preparing solid, rust colored, poly(propynol) which is insoluble in water and organic solvents prepared by the polymerization of anhydrous propynol which comprises refluxing said propynol in a solution of nickel dicarbonyl di(triphenylphosphine) in an inert non-hydroxylated organic solvent.

References Cited
UNITED STATES PATENTS

| | | | |
|---|---|---|---|
| 2,961,330 | 11/1960 | Meriwether | 260—94.1 |
| 3,032,573 | 5/1962 | Meriwether et al. | 260—94.1 |
| 3,051,694 | 8/1962 | Meriwether et al. | 260—94.1 |
| 3,117,952 | 1/1964 | Meriwether | 260—94.1 |
| 3,271,378 | 9/1966 | Daniels | 260—94.3 |

JOSEPH L. SCHOFER, *Primary Examiner.*

H. WONG, JR., *Assistant Examiner.*